LEEDS & VAUX.
Thermometric Regulator for Heating Apparatus.

No. 25,514. Patented Sept. 20, 1859.

Witnesses:
Ch.s M. Hughes
Mech. Hughes

Inventors:
Lewis W. Leeds
Calvert Vaux

UNITED STATES PATENT OFFICE.

LEWIS W. LEEDS AND C. VAUX, OF NEW YORK, N. Y.

THERMOMETRIC REGULATOR FOR HEATING APPARATUS.

Specification of Letters Patent No. 25,514, dated September 20, 1859.

*To all whom it may concern:*

Be it known that we, LEWIS W. LEEDS and CALVERT VAUX, both of the city, county, and State of New York, have invented a new and Improved Thermometric Regulator for Heating Apparatus; and we do hereby declare that the following is a full, clear, and exact description of the same, reference being had to the accompanying drawings, forming part of this specification, in which—

Figure 1:
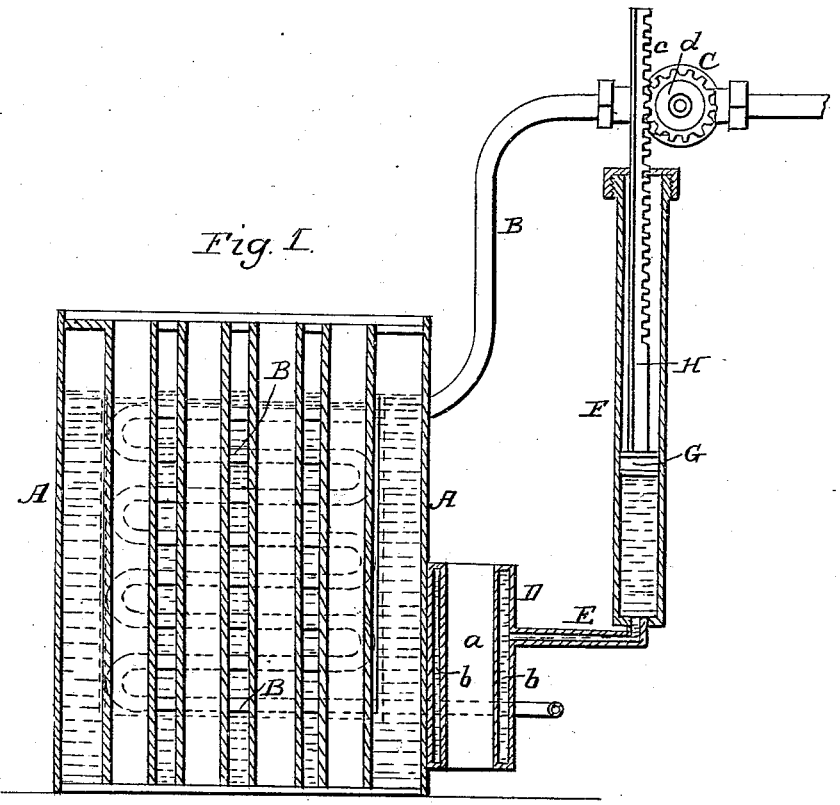
Figure 2:
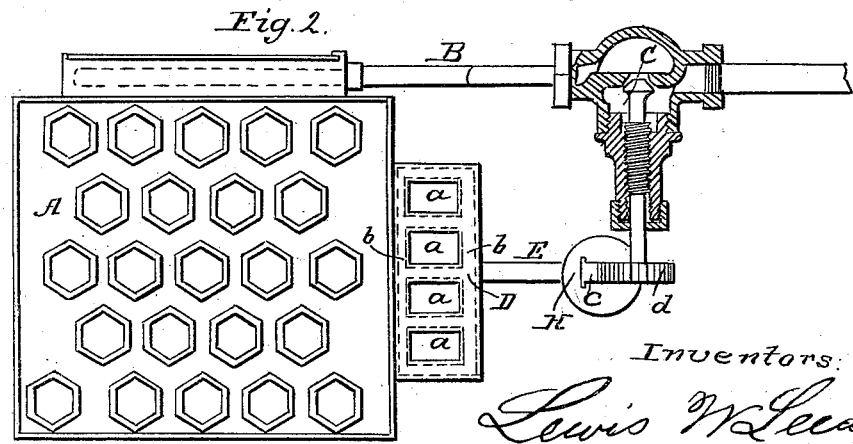

Figure 1, is a vertical sectional view of our thermometric regulator applied to a heating apparatus. Fig. 2, is a plan of the same with the regulating valve in section.

Similar letters of reference indicate corresponding parts in both figures.

In the various kinds of apparatus for heating air for warming buildings many kinds of regulators have been used but mostly of two classes, one class being controlled by the temperature of the apartment or one of the apartments that is warmed, and the other by the temperature of the heater itself. The first class may serve the purpose very well when the building contains but one apartment but in a dwelling house or building containing many apartments to be warmed by the same apparatus it is obviously almost impossible to regulate the temperature of all the apartments by that of any one of them, and the second class can never operate successfully in a climate of very variable temperature as they tend to preserve a uniform temperature of the heater without regard to the temperature of the incoming cool air.

The object of our invention is to obtain a regulator more perfect than any operating upon either of the above mentioned systems and to this end our improved thermometric regulator consists of a vessel which we term a secondary heater having no internal communication with the heater which we will term the primary heater by which the air for warming the building is heated, but exposed at the same time to the heating influence of the primary heater and to the cooling influence of the current or currents of incoming cold air, and containing water or other fluid which by its expansion and contraction by variations in its temperature is caused to operate upon a piston or its equivalent connected or geared with a regulating cock or valve in the pipe which supplies the steam or other heating agent to the primary heater, in such a manner as to cause the supply of such agent to the heater to vary inversely with the temperature of the incoming cold air.

To enable others skilled in the art to make and use our invention we will proceed to describe its construction, application and operation.

The heating apparatus represented is of that kind which constitutes the subject-matter of Letters Patent of Lewis W. Leeds, No. 23,096, but our improved thermometric regulator is applicable to other kinds of heating apparatus and that particular kind is only shown because it serves as well as any other for illustration.

A, is the water vessel or primary heater.

B, is the steam pipe for conveying steam from the boiler to the coil B, within the heater to heat the water in said heater and C, is the regulating valve to which our regulator is applied to control the supply of steam to the coil. The valve represented is what is known as a globe valve, but other kinds of valves or a cock may be used.

D, is the secondary heater constituting the principal portion of our improved regulator consisting of a close vessel or chamber having a number of tubes *a, a,* extended right through it. One side of this heater fits close up against the lower part of one side of the primary heater so that heat may be conducted from the latter to the water or other fluid within the former and that some of the incoming currents of cold air may pass through the tubes *a, a,* and over its outer surfaces before being heated by passing over the surfaces of the primary heater. A single sheet of metal may serve to form the division between the two heaters in which case the heat will be conducted more rapidly than when each heater is made separate as shown in the drawing.

From the space *b, b,* surrounding the tubes *a, a,* within the secondary heater a pipe E, leads to a cylinder F, which contains a piston G, to which is attached a rod H, on one side of which is a toothed rack *c*, gearing with a pinion *d*, on the stem of the regulating valve C. The space *b, b,* is entirely filled with water or other liquid and so is the pipe E, and cylinder F, and the piston G, which fits to work easily but closely in the cylinder F, rests on the surface of the water or other fluid in said cylinder, and according as this water or other fluid in the secondary heater is heated to a lesser or greater degree, it is more or less expanded, and the piston occupies a higher or lower position in the cylinder, and the valve C, is less or more open, said valve being geared to be opened wider as the piston descends and to have its opening reduced as the piston rises.

The secondary heater is so arranged or the incoming cold air so directed that currents of such air flow continually through the tubes a, a, and hence the temperature of the water in the secondary heater depends in a very great degree upon the temperature of the incoming cold air and consequently the water in said heater expands or contracts very soon after any rise or fall of the atmospheric temperature takes place, and so gives more or less opening to the valve or cock and diminishes or increases the supply of steam to the heater, and if the valve is properly adjusted and the gearing between it and the piston properly proportioned, the regulation to suit the requirements of the changes of atmospheric temperature will be very perfect and a uniform temperature will be preserved within the building.

It will be readily understood that the secondary heater may be of different form and construction from the one we have represented, and may be arranged differently, as for instance, inside of the primary heater, but it must be so constructed and applied that some of the incoming cold air will pass over a portion of its surface before being heated by the primary heater.

We do not claim the invention of a regulator composed of a vessel or chamber containing fluid and a piston operated upon by the expansion and contraction of such fluid to work a valve, when such vessel or chamber is not so applied as to be at the same time exposed both to the heating influence of the main heater and to the cooling influence of the incoming cold air and is not applied to control the admission to the heater of the steam or other heating agent; but

What we claim as our invention and desire to secure by Letters Patent, is,

So applying the vessel which we have termed the secondary heater containing the fluid to act upon the piston or its equivalent in combination with the primary heater, and so applying the piston or its equivalent in combination with said secondary heater and with the regulating valve, as herein described, that the secondary heater is exposed at the same time to the heating influence of the primary heater and the cooling influence of the incoming cold air, and the fluid contained therein is by its expansion and contraction made to control the admission of the steam or other heating agent and cause the supply of such agent to the heater to vary inversely with variations in the atmospheric temperature as herein set forth.

LEWIS W. LEEDS.
CALVERT VAUX.

Witnesses:
 MICH. HUGHES,
 CHS. M. HUGHES.